US012607960B2

(12) United States Patent
DeLacy et al.

(10) Patent No.: US 12,607,960 B2
(45) Date of Patent: Apr. 21, 2026

(54) TAGGING AND AUTHENTICATION OF ARTICLES USING A HOLOGRAPHIC INTERFERENCE PATTERN

(71) Applicant: Ballydel Technologies, Inc., Wilmington, DE (US)

(72) Inventors: Brendan G. DeLacy, Wilmington, DE (US); Mark S. Mirotznik, Wilmington, DE (US); Benjamin S. Garrett, Wilmington, DE (US)

(73) Assignee: Ballydel Technologies, Inc., Wilmington, DE (US)

( * ) Notice: Subject to any disclaimer, the term of this patent is extended or adjusted under 35 U.S.C. 154(b) by 463 days.

(21) Appl. No.: 18/176,269

(22) Filed: Feb. 28, 2023

(65) Prior Publication Data

US 2023/0273571 A1 Aug. 31, 2023

Related U.S. Application Data

(60) Provisional application No. 63/314,533, filed on Feb. 28, 2022.

(51) Int. Cl.
*G03H 1/00* (2006.01)
*G06V 10/88* (2022.01)

(52) U.S. Cl.
CPC ........... *G03H 1/0011* (2013.01); *G06V 10/88* (2022.01)

(58) Field of Classification Search
CPC ........... G06V 10/88; G03H 2001/2215; G03H 2270/21; G03H 2270/52; G03H 2001/0016; G03H 2001/2247
See application file for complete search history.

(56) References Cited

U.S. PATENT DOCUMENTS 8,680,488 B2 3/2014 Mcmorran
9,442,246 B2 9/2016 Brunet
(Continued)

FOREIGN PATENT DOCUMENTS

CN 108445728 A * 8/2018 ........... G03H 1/0011
CN 110414648 A * 11/2019 ........... G03H 1/0011
(Continued)

OTHER PUBLICATIONS

Gianlucca Ruffato, Roberto Rossi, Michele Massari, Erfan Mafakheri, Pietro Capaldo & Filippo Romanato; Design, fabrication and characterization of Computer Generated Holograms for anti-counterfeiting applications using OAM beams as light decoders; scientific study report; Dec. 17, 2017; 13 pp.; (2017) 7:18011 | DOI:10.1038/s41598-017-18147-7; Springer Nature; Germany.

*Primary Examiner* — Paul C Lee
(74) *Attorney, Agent, or Firm* — Kim and Lahey Law Firm, LLC; Douglas W. Kim

(57) ABSTRACT

A computerized system for uniquely tagging and verifying authenticity of an article comprising: an object having a curvature; a computer system adapted to: receive a three-dimensional predetermined image, create a holographic interference pattern created according to the three-dimensional predetermined image and the curvature wherein the holographic interference pattern is applied to the object, project a three-dimensional resulting image projected on a planar surface in response to the holographic interference pattern being illuminated wherein the computer system receives the three-dimensional resulting image, create validation information according to a comparison of the three-dimensional predetermined image and the three-dimensional resulting image.

18 Claims, 7 Drawing Sheets

(56)         References Cited

U.S. PATENT DOCUMENTS

| | | | |
|---|---|---|---|
| 10,089,478 B1 | 10/2018 | Fraser et al. | |
| 11,083,807 B2 | 8/2021 | Ashrafi | |
| 2008/0241952 A1* | 10/2008 | Millington | G03H 1/18 |
| | | | 436/164 |
| 2012/0224263 A1* | 9/2012 | Gallagher | G02B 5/1861 |
| | | | 359/570 |
| 2014/0139608 A1* | 5/2014 | Rosario | B23K 26/359 |
| | | | 347/225 |
| 2017/0370838 A1 | 12/2017 | Ashrafi et al. | |
| 2020/0233377 A1 | 7/2020 | Weston et al. | |
| 2020/0407082 A1 | 12/2020 | Ashrafi | |

FOREIGN PATENT DOCUMENTS

| | | |
|---|---|---|
| CN | 111240173 | 2/2021 |
| CN | 112910551 | 6/2021 |
| EP | 2310874 | 2/2012 |
| WO | 2015132752 A2 | 9/2015 |

* cited by examiner

TAGGING AND AUTHENTICATION OF ARTICLES USING A HOLOGRAPHIC INTERFERENCE PATTERN

FEDERAL CONTRACT NOTIFICATION

This invention was made with government support under SBIR Contract 2111844 awarded by the National Science Foundation. The government has certain rights in the invention.

BACKGROUND OF THE INVENTION

1) Field of the Invention

This invention is directed to a system and method of uniquely tagging and marking containers such as glass vials and the like to provide for unique identification and verification of the vial and its contents.

2) Description of the Related Art

The prevalence of counterfeit drugs within the global pharmaceutical market is driving the need and adoption of sophisticated anti-counterfeit technologies for ID security and brand protection. The counterfeit prescription drug market is particularly troublesome to pharmaceutical companies that spend billions of dollars each year on research, clinical trials, regulatory approval, and product development. Not only does the counterfeit prescription market undermine sales, profits, and brand integrity, millions of people are also exposed to potentially lethal chemicals. Many of the counterfeited drugs are sold via illegal online pharmacies around the world. The World Health Organization estimates that 50% of drugs sold online are fraudulent. Furthermore, WHO estimates that approximately 1 million people die annually after taking counterfeit drugs. Equally harmful are those counterfeits that contain no active ingredients, allowing patients to suffer or die from an otherwise curable illness. Given the global coronavirus pandemic that emerged in 2020, and the significant global demand and investment in vaccines, there is an even greater need for an ID security technology that enables the efficient covert tagging and tracking of vaccine products throughout the supply chain.

Based on direct feedback from vaccine/biologic manufacturers, ID security for vaccine and other injectable products represents a significant gap in brand security and counterfeit mitigation. Specifically, there is a need to covertly tag and authenticate the vials which house vaccines and biologic injectables. Measures to track a given drug product typically involve tagging the drug package with a unique encoded identifier, usually a scannable barcode. Manufacturers may use linear (barcode), two-dimensional (QR code), or radio frequency identification (RFID) coding. These technologies enable the drug container to be tracked and traced from manufacturer through wholesaler, and pharmacist. Unfortunately, these measures are highly susceptible to counterfeiting on the market.

As an initial mitigation strategy, some manufacturers have employed the addition of a fluorescent tag to its glass vials, which is only viewable with black light illumination. Although this approach provides some degree of authenticity, this approach can hardly be classified as sufficiently covert and does not provide any encrypted information about the product. Additionally, the chemical tagging approach that is often considered for pills and tablets is not a viable option for vaccine products. There is a market need for the integration of a covert tag for vials that sufficiently provides product information such as manufacturing date, manufacturing location, expiry, lot number, and other information.

To provide for the verification of authenticity, there have been some effort for using holograms that can include encoded information that can be seen using light beams carrying orbital angular momentum (OAM). However, these attempts had been preliminary attempts are limited to experimental efforts without real world application. Using this technology to provide verification of authenticity for objects has not been a problem where sufficient attention has been provided. In fact, on attempt states that the presence of the actual physical object is nowadays not necessary. Therefore, the ability to use a holographic interference pattern on an actual physical object for providing authenticity and validation is a problem where much attention is needed.

Accordingly, it is an object of the present invention to enable the efficient covert tagging and tracking of pharmaceutical products in vials that can have curved surfaces, such as vaccines and other injectable products, throughout the supply chain to assist companies, health systems, and regulatory agencies in preventing the distribution of counterfeit drugs and mitigating the negative health effects associated with counterfeit drug distribution.

It is a further object of the present invention to provide such covert tagging that would enable the vaccine industry to corroborate the product information on overt labels with the encrypted information embedded in covert labels included on the vials.

BRIEF SUMMARY OF THE INVENTION

The above objectives are accomplished by providing a system and method for uniquely identifying a surface comprising: providing a substrate; applying to the substrate a holographic interference pattern that is created from a holographic interference pattern and information from a curvature on a physical object where there is an image viewable according to a projection from a light source through the holographic interference pattern. The light can be projected as a first beam of coherent light onto the holographic interference pattern to provide for a first image wherein the first image is recognizable to a viewer. The image can be created when the light passes through the holographic interference pattern as well as the curvature of an object to form a projected image on a planar surface.

When there is a projection of a second beam of light that is not designed to operate with the holographic interference pattern, a projected image may not be recognizable to a viewer indication invalidity. A comparison of the first image or the second image can provide validation when the first image is matched to a known image. A match of the projected image with the first image or the second image when there is a lack of authenticity.

The substrate can be taken from the group consisting of a glass surface, curved surface, sticker, adhesive, plastic, metal, ceramic, and any combination thereof. The substrate can be transparent or opaque. The first image is a reflective image from the substrate. Projecting a first beam of coherent light onto the holographic interference pattern to provide for a first image can include projecting the first image according to the holographic interference pattern and a substrate curved surface. The first image can include a sub-image is taken from the group consisting of a logo, bar code, alpha numeric text, QR code, and any combination thereof. The first image can include identification information taken from the group consisting of manufacturer, manufacturing location, product description, manufacturing date, lot, expiry, and any combination thereof.

The system can include a server; a known image digitally stored on a computer readable medium in communications with the server; a holographic interference pattern applied to a substrate wherein the holographic interference pattern is adapted to display a verification image when illuminated with structured light generated by a spiral phase plate; a sensor for receiving the verification image; a set of computer readable instructions included in the server adapted for retrieving the know image, receiving the verification image from the sensor, comparing the known image to the verification image, and displaying a verification indication when the know image and the verification image match. The holographic interference pattern can be encoded with orbital angular momentum.

A system can include an object having a curvature; a holographic interference pattern created according to a three-dimensional predetermined image and the curvature wherein the holographic interference pattern is applied to the object; a three-dimensional resulting image projected on a planar surface in response to the holographic interference pattern being illuminated by a first coherent light source; and, a validation information created according to a comparison of the three-dimensional predetermined image and the three-dimensional resulting image. The system can be computerized so that the functional and operation described herein can be performed by a set of computer readable, instructions and hardware combined. The system can include a computerized validation system adapted to receive the three-dimensional predetermined image, receive the three-dimensional resulting image, and create the validation information according to a comparison of the three-dimensional predetermined image and the three-dimensional resulting image. The holographic interference pattern, when applied to the object, can include a first refractive index and a second reflective index and the three-dimensional resulting image can be formed according to the holographic interference pattern, the first refractive, index, and the second refractive index. The reflective indexes can be used to define the angles of pillars and the optical properties, reflectiveness, reflectiveness and the like, according to the refractive indexes. For example, if a portion of the holographic interference pattern requires a pillar with a reflective angle of X and the object or substrate that is over or under that portion has a reflective angle of Y, the holographic interference pattern for that portion can be created with a reflective angle of X−Y or X+Y. The holographic interference pattern can be created according to a creation computerized system adapted to create the three-dimensional predetermined image according to the three-dimensional predetermined image, curvature of the object or substrate and reflective or refractive indexers of cooperating surfaces.

An identifier can be applied to the object and can include a predetermined alignment with the holographic interference pattern. A computerized validation system can be adapted to receive an image of the object having the identifier and the holographic interference pattern, determine a position of the identifier in relation to the holographic interference pattern and create an alignment verification information representation that the identifier and holographic interference pattern applied to the object are consistent with the predetermined alignment. The identifier can include information taken from the group consisting of a logo, bar code, alpha numeric text, QR code, manufacturer information manufacturing location, product description, manufacturing date, lot, expiry, ingredients, contents, and any combination thereof.

A curvature associated with the substrate can be created by affixing the substrate to an object wherein the object include a curved surface. The curve can be convex, concave, planar and any combination thereof. The substrate can be taken from the group consisting of a glass surface, curved surface, sticker, adhesive, plastic, metal, ceramic, and any combination thereof. The holographic interference pattern can be is created according to a reflective property of the substrate, one or more reflective indexes associated with the object or substrate and can include pillars that extend from the curvature in a parallel arrangement.

The holographic interference pattern can be illuminated by a light having an orbital angular momentum to produce a three-dimensional resulting image. The structured light can include an orbital angular momentum according to a spiral phase plate.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1A:
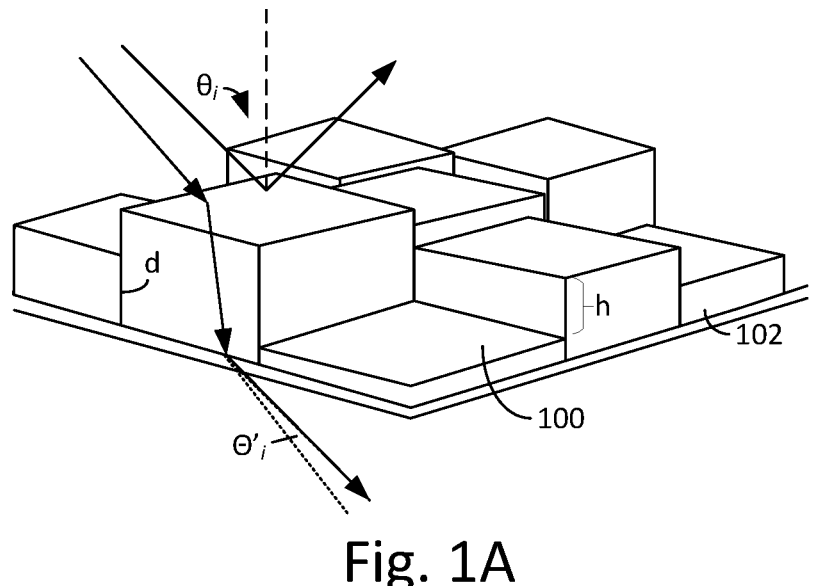
FIG. 1A is a perspective view of a holographic interference pattern, label or imprint according to the present invention.
Figure 1B:
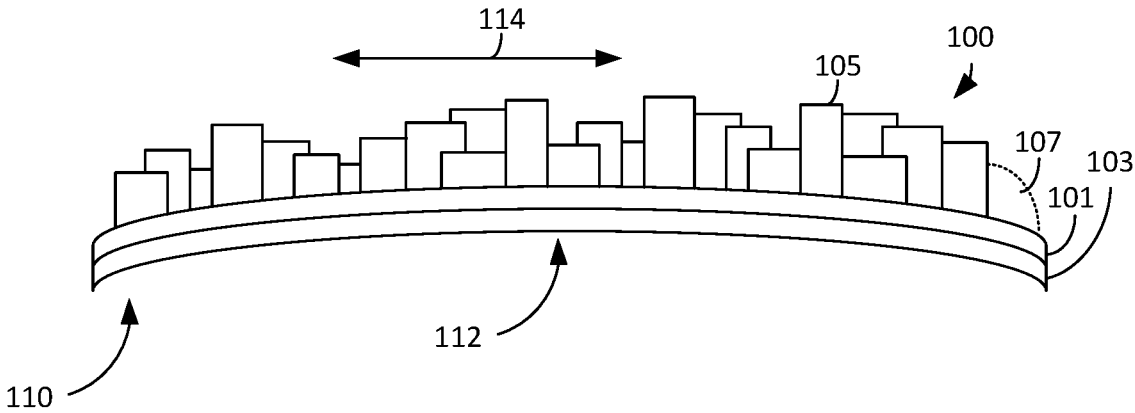
FIG. 1B is a side view of a holographic interference pattern, label or imprint according to the present invention.

Referring to FIGS. 1A and 1B, a holographic interference pattern which includes a computer-generated holographic pattern is shown that can be applied to a surface such as a label applied to a glass vial or imprinted directly on the glass vial. In one embodiment, a pattern can be applied using laser machining onto a flat or curved surface. The holographic interference pattern 100 can begin with a digital design of a three-dimensional predetermined image that may be printed, stamped, etched, or otherwise transcribed into a given material using known techniques to those skilled in the art. The holographic interference pattern can be a physically recorded interference pattern between the coherent reference beam and the wave scattered by the patterned substrate. The pattern can include one or more pillars that, when light is transmitted through the pillar, the light transvers a distance d through the pillar. One pillar can be adjacent to another pillar so that a first pillar extends above the adjacent pillar a height h.

The composition of the substrate material, its refractive index, and design of the holographic interference pattern 100 itself can influence the type of interference pattern generated. In some embodiments, the resolution, and spatial features of the holographic interference pattern 100 are impacted by the selected fabrication process. The object that receives the holographic interference pattern can include a surface that has one or more refractive indexes so that the holographic interference pattern is adapted to provide a three-dimensional resulting image when illuminated with coherent light.

The holographic interference pattern 100 can be disposed on a substrate 101. The substrate can be flat, rounded, convex, concave, and any combination thereof. The object receiving the holographic interference pattern can include one or more of these shapes and be adapted to produce the three-dimensional resulting image. The three-dimensional resulting image can be compared with the three-dimensional predetermined image that can be used, alone or in combination with the surface features of the object or substrate, to create the holographic interference pattern. The substrate can be flexible so that it can be flat during the manufacturing process and rounded when applied to a rounded surface such as a vial. The object or substrate can include a first refractive index 110 representing a first curve and a second refractive index 112 representing a second curve. The refractive indexes can be unequal.

An adhesive 103 can be used to secure the substrate to a surface such as a vial. The holographic interference pattern can include pillars 105 can include a top surface which can be used for reflecting or refracting light. The pillars can have a varied height. In one embodiment, the pillars are configured to be orthogonal to a plane generally parallel to the substrate when the substrate is flat. When the substrate is applied to a surface, the pillars can be configured to maintain the orthogonal configuration and can include tops portions that are parallel to a plane 114. In one embodiment, the pillars at the edge of the pattern can have an angle defined between a wall of the pillar and the top surface of the substrate so that the angle 107 is greater than 90 degrees. In this configuration, the pillars provide a generally flat surface to interact with light. In one embodiment, the pillars can fan out along the substrate when applied to a rounded surface so that the pillars top surfaces are in an arc. The light and interpretation of the light can account for each of the configurations to produce an image that can represent an authentic article. The three-dimensional predetermined image can be compared with the three-dimensional resulting image and when these images are consistent, it can indicate an authentic object including a container and vial.

The resulting image can be compared with the predetermined images by a computerize system that can include computer readable instructions that, when executed by a processor, are adapted to receive the physical properties of the object, container, vial, substrate and the like, receive a three-dimensional predetermined image, create a holographic interference pattern according to this information and material received, receive identifying information, and print or otherwise provide a holographic interference pattern on the object or substrate. The computer system can have the three-dimensional resulting image projected upon an input such as a camera so that the computer system can compare the three-dimensional resulting image with the three-dimensional predetermined image, The computer device can also receive the identifier which can be used to retrieve additional information associated with the identifier.

The holographic interference pattern can be disposed on a tag, image area, etched area and the like and can be read by illuminating and probing the holographic interference pattern with a suitable coherent light source. The light source can be of a specific wavelength and can be light that is commonly referred to as laser light. The reconstruction of the far-field image may be mathematically expressed as well as expressing in computer readable instructions (e.g., etching instructions) expressed by the Fresnel-Kirchhoff diffraction equation. In this relation diffraction field, Q(x,y,z), is generated at a distance z from a diffractive optical element, given by:

$$O(z, y, z) = \frac{e^{-ikz}}{i\lambda z} \int \int_x U^i(x'y')G\left((x'y')e^{ik\frac{(x-x')+(y-y')2}{2z}}dx'dy'\right) \quad \text{(Eq. 1)}$$

where $U^i(x', y')$ is the complex field incident on the holographic plane, $G(x',y')$ is the diffractive optical element transmission function $(x',y')$ and $(x,y)$ are the Cartesian coordinates on the holographic plane and on the image plane respectively, and k=$2\pi/\lambda$ is the incident wave vector, with $\lambda$ as the incident wavelength. By developing the two square terms in the exponential contribution inside the integral in Eq. 1, the following form is provided:

$$O(x, y, z) = \frac{e^{-ikz}}{i\lambda z}e^{ik\frac{(x^2+y^2)}{2z}}FT[A*]\left(\frac{x}{\lambda e'}, \frac{y}{\lambda z}\right). \quad \text{(Eq. 2)}$$

where FT stands for the Fourier Transform operator. The diffraction field O(x, y, z) is related to the Fourier Transform of a modified hologram transmission function A*, calculated at the spatial frequencies(x/$\lambda$z,x/$\lambda$z). The transmission function A* is defined as:

$$A*(x', y') = U^i(x', y')G\left((x', y')\exp\left(ik\frac{x'^2 + y'^2}{2x}\right)\right) \quad \text{(Eq. 3)}$$

The holographic interference pattern can be a computer-generated schemes and can be designed to be either transmission or reflection depending on the object in which it is place or the substrate and its construction. The holographic interference pattern can be engineered to manipulate either the phase or the amplitude (or both) of the input wave to provide the resulting image. In one embodiment, a control over phase is used. The phase control of the holographic interference pattern can be expressed by its phase function $\varphi$(x, y) which for the reflection mode can be described as:

$$\varphi(x, y) = \frac{4\pi}{\lambda}\cos(\theta_i)h(x, y). \quad \text{(Eq. 4)}$$

$\theta_i$ can be the incident angle if illumination and h(x, y) is the depth of the holographic interference pattern at the coordinates (x, y).

Light that exhibits a helicoidal phase front possess a well-defined orbital angular momentum. These beams can be characterized by a phase term exp(i $\ell$ $\varphi$) where $\ell$ is the amount of orbital angular momentum carried by each photon in units of $\hbar$. In one embodiment, an orbital angular momentum beam can be described in terms of Laguerre-Gaussian modes (LG) characterized by two indices $\ell$ and p, the azimuthal and radial index, respectively. The azimuthal index $\ell$ can represent the number of intertwined helical wavefronts. The index p represents the number of radial nodes on a plane perpendicular to the direction of propagation and is related to the distribution of intensity pattern in p+1 concentric rings around the central dark zone.

With reference to FIGS. 1A and 1B, the holographic interference pattern can include a pattern that can include a set of subsections 101. Each subsection can include a transmission component, reflective component, color component, height, width, pitch, and the like. The set of subsections can be used to design an image wherein when light is directed to the pattern, the light is reflected and refracted in a manner wherein each subsection can act as a component of the image. In one entombment, a known image can be used to create the holographic interference pattern where the image can include pixels and each subsection can correspond to a pixel. Therefore, when the proper light is used to illuminate the set of subsections, the resulting image corresponds to the predetermined or known image, but only if the proper light is used. If the resulting image matches the known image, the system and comparison can be used for authentication, validation, and other analysis.

In one embodiment, the holographic interference pattern can be etched in a removable substrate, for example a label or sticker that can be affixed to a container. If the label is removed or there is an attempt to remove the label, the set of subsections 102 is mechanically modified, and the holographic interference pattern will not produce a reflective or refracted image that matches the known image.

Figure 2A:
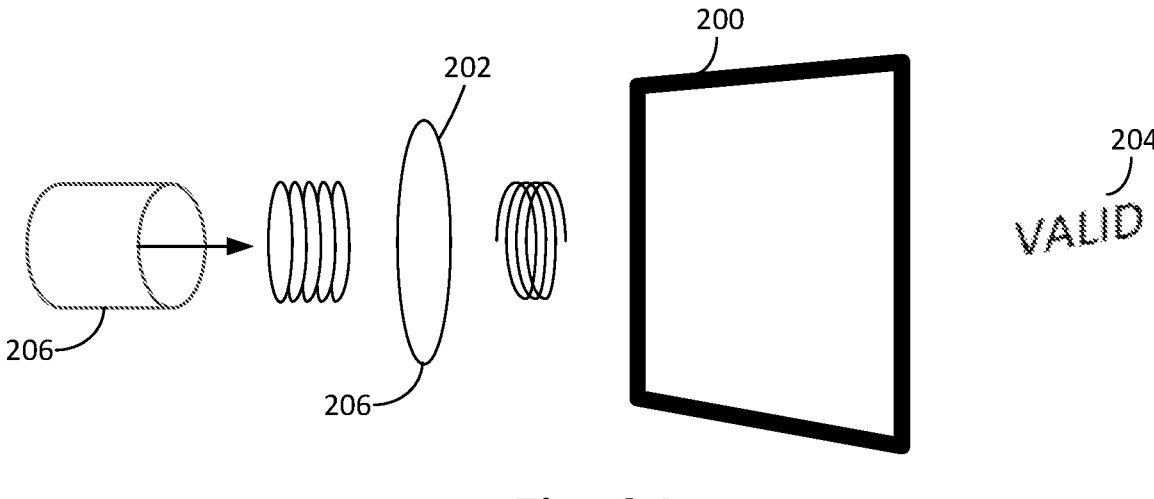
FIGS. 2A and 2B are perspective views of different light structures that can be applied to the holographic interference pattern.
Figure 2B:
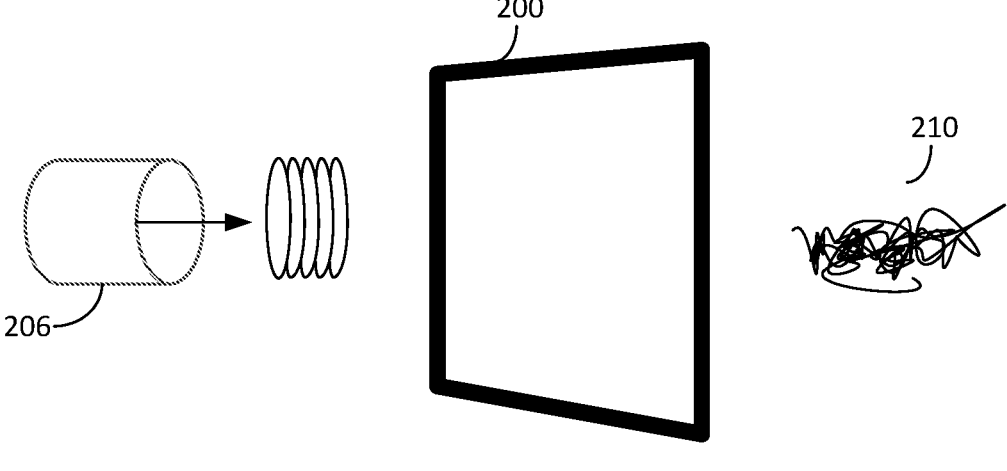

Referring to FIGS. 2A and 2B, a holographic interference pattern 200, which can be computer-generated, can be encoded with a structured light generated by a spiral phase plate 202. The encoded image 204 is viewable through the conversion of a Gaussian beam to a beam 206 that can have an orbital angular momentum 208. On bottom, the light beam does not pass through the spiral phase plate 202 and the projected encoded image 210 from the holographic interference pattern 200 is unresolved and not recognizable since the incident beam is not encoded with structured light. On top, the structured light includes the spiral phase plate 202 and the projected encoded image 204 from holographic interference pattern 200 is therefore visible and recognizable. In the example shown, the image is a visual representation of text which can be used to verify the authenticity of the holographic interference pattern. When the Gaussian beam is used alone, the resulting far field image 210 is not recognizable. Therefore, a unique system and method of identifying a product is provided.

In one embodiment, the holographic interference pattern is etched onto a substrate that can be included in a tag or label that can be affixed to a product. The label can be configured so that if it is removed, the holographic interference pattern is physically and mechanically altered so that the image resulting from the projection of light does not match the three-dimensional predetermined image. Therefore, the removal or attempted removal of a tag, label or the like having the holographic interference pattern from an object can be detected, and therefore actual or potential tampering with the label or object can be detected. An adhesive to securing the substrate to the object or product can be transparent. The holographic interference pattern can also be made according to the transparency of the adhesive and substrate. For example, the reflective index of the substate or adhesive cab be used to determine the holographic interference pattern so that when light passes through or reflects from the holographic interference pattern, the effect of the adhesive and substate are considered. In one example, if the substrate or object is know to bend light at a first angle and the holographic interference pattern has an area that needs to bend light at a second angle, the angle of the holographic interference pattern can be reduced so that the aggregate of the substrate refractive index and that of the holographic interference pattern produce the desired three-dimensional resulting image.

Figure 3:
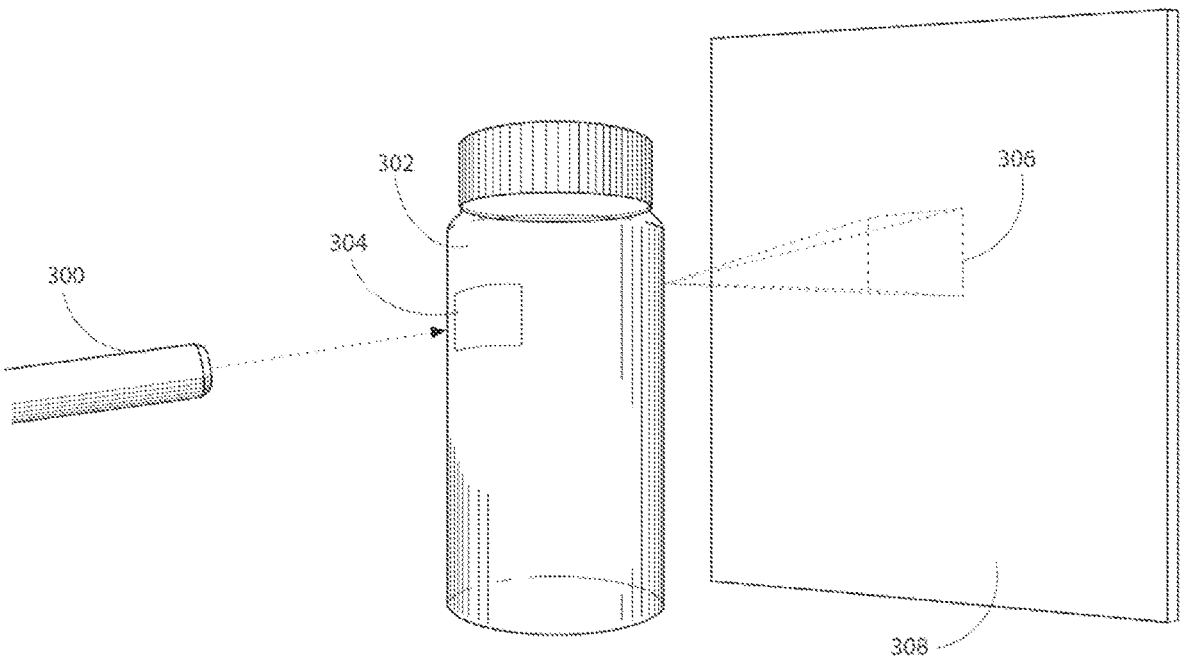
FIG. 3 is a perspective view of a holographic interference pattern transmissive label applied to a vial according to the present invention.

In one embedment, over ninety percent of the light transmitted onto the holographic interference pattern is transmitted through the holographic interference pattern. In one embedment, less than 5 percent of the light transmitted onto the holographic interference pattern is reflected. In the example embodiment shown in FIG. 3, a structured light beam 300 is applied to a glass vial 302. The glass vial includes a holographic interference pattern 304 on a transparent label that is affixed to the glass vial. The beam passed through the glass vial 302 and holographic interference pattern 304 resulting in a projected or resulting image 306 being displayed on an adjacent surface 308 behind the glass vial 302 for validation with a visual inspection or via a code reader or other data collection sensor. The curvature of the glass vial 302 can be considered when designing and applying the holographic interference pattern to the substrate (product, container, or label) so that the curvature of surface does not significantly impact the resulting projected image. The holographic interference pattern can be on a side, top of bottom of the object. The surface that carries the holographic interference pattern can be concave or convex.

The holographic interference pattern can be applied to a substrate so that the holographic interference pattern remains intact when in temperatures in the ranges of −100° C. to 1200° C. or higher. The holographic interference pattern can be applied on a substrate and a protective layer can be provided over the holographic interference pattern. The protective layer can be designed to withstand mechanical, chemical, and environmental stresses preventing the altercation of the holographic interference pattern due to these factors. The substrate may comprise various materials or surface including, but not limited to, a glass surface, curved surfaces, label/sticker, adhesive, plastic, metal, ceramic, rubber and any combination thereof. In one embodiment, the substrate for the reflective or transmissive holographic interference pattern may be selected from the group consisting of acrylonitrile butadiene styrene (ABS), polylactide (PLA), nylon, acrylic, phenolic, polyester, polyester terephthalate (PET), polyethylene, polypropylene, polycarbonate, polyurethane, polyacetal resin (POM), polyvinyl chloride (PVC), poly(methyl methacrylate) (PMMA), epoxy resin, phenolic resin, polytetrafluoroethylene (PTFE), high density polyethylene (HDPE), silicone, polyurethane, polyvinyl chloride (PVC), silicone rubber, isoprene rubber, thermoplastic elastomers, polyurethane rubbers, and combinations thereof. In one preferred embodiment, the substrate is PET. For transmissive labels, the PET substrate is patterned directly into the PET sheet and an adhesive layer is applied to the opposite side for adhering the PET label to a glass vial or other object.

Figure 4:
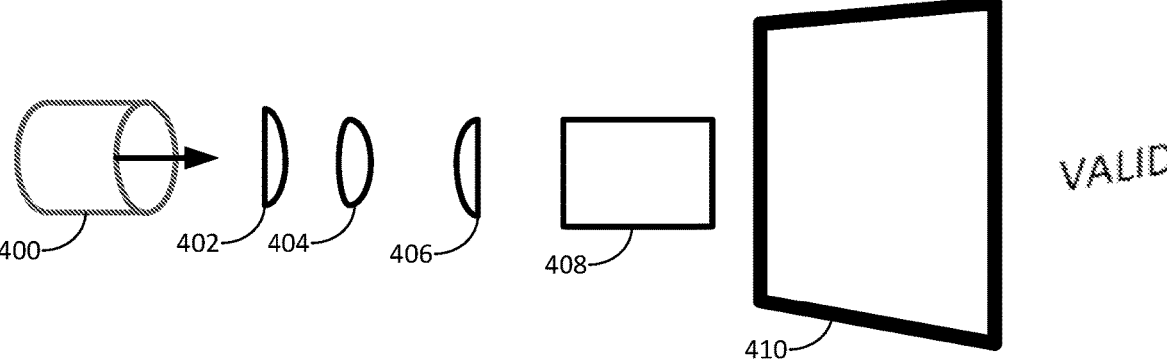
FIG. 4 is a schematic of a structure light lens arrangement applied to a holographic interference pattern, label, substrate, or etching according to the present invention.

Referring to FIG. 4, an example embodiment of a reader for verification, authentication and other analysis of the holographic interference pattern is shown. The reader includes a light source such as a laser 400 that can be converted into structured light, including spiral light, that can be focused or otherwise directed by a first lens 402. The light can pass through a spatial filter 404 (for example, a spiral phase plate 500, FIG. 5) and a second lens 406. A beam splitter 408 can be included that allows the light to pass through the beam splitter into the holographic interference pattern 410 and directed to a sensor or other direction, including displaying a visually perceivable indication of validity. The reflective light can be received by a sensor such as a charged-coupled device that can convert the reflective light into electrical information thereby digitizing the reflective light from the holographic interference pattern 410. The resulting image can be compared with a predetermined image and if the images match, the holographic interference pattern can be found to be authentic and/or verified.

Figure 5:
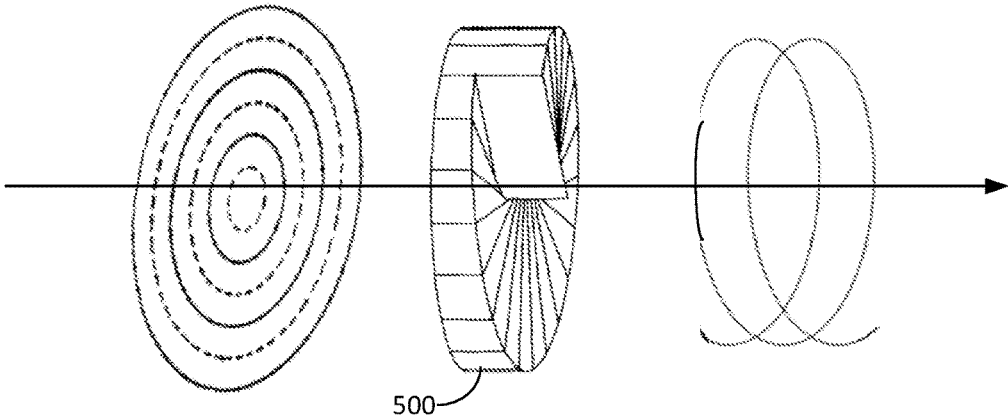
FIG. 5 is a perspective view of a spiral phase plate according to the present invention.

Referring to FIG. 5, in one embodiment, the orbital angular momentum can be generated by using a spiral phase plate 500. A spiral phase plate can appear as a spiral staircase can be adapted to convert a Gaussian beam into an orbital angular momentum beam. The spiral phase plate can include transparent optical element with a thickness h that can increase as a function of the azimuthal coordinate according to the following:

$$h(r, \varphi) = \ell \frac{\varphi}{2\pi} \frac{\lambda}{SPP^{-n_0}}. \tag{Eq. 5}$$

where $n_{SPP}$ is the refractive index of the spiral phase plate material, $n_0$ is the refractive index of the surrounding medium, and $\lambda$ is the wavelength of incident radiation. Optimization of both the design and fabrication of high-order orbital angular momentum beams with non-zero radial index may be achieved by introducing radial $\pi$-discontinuities on the spiral phase plate $\Omega_{SPP}$:

$$\Omega_{SPP}(r, \varphi) = \ell\varphi + \frac{\pi}{2}\left\{1 - \text{sgn}\left[L_p^{|\ell|}\left(\frac{2r^2}{w_0^2}\right)\right]\right\}. \tag{Eq. 6}$$

The light that is applied to the holographic interference pattern can be generated so that matching the light with the holographic interference pattern results in a three-dimensional resulting image that matches or is consistent with the three-dimensional predetermined image. Therefore, authentication or validation can be accomplished by a specific computer system and device having this structured light as well as the specifically designed holographic interference pattern.

In one embodiment, the holographic interference pattern can be adapted for reflecting or refracting a particular structure light. The structured light can be produced by projecting light with a known pattern on to a scene. For example, as shown in FIG. 2, an incident gaussian light beam may be structured into a spiral, helicoidal phase profile, using a diffractive optical element such as a spiral phase plate. This process generates a beam with orbital angular momentum. By adapting the holographic interference pattern with orbital angular momentum, one may only be able to see, view or detect a meaningful projected image by probing the holographic interference pattern with coherent light of a specific wavelength and by using a specific diffractive optical element that produces structured light with a specific phase.

Figure 6:
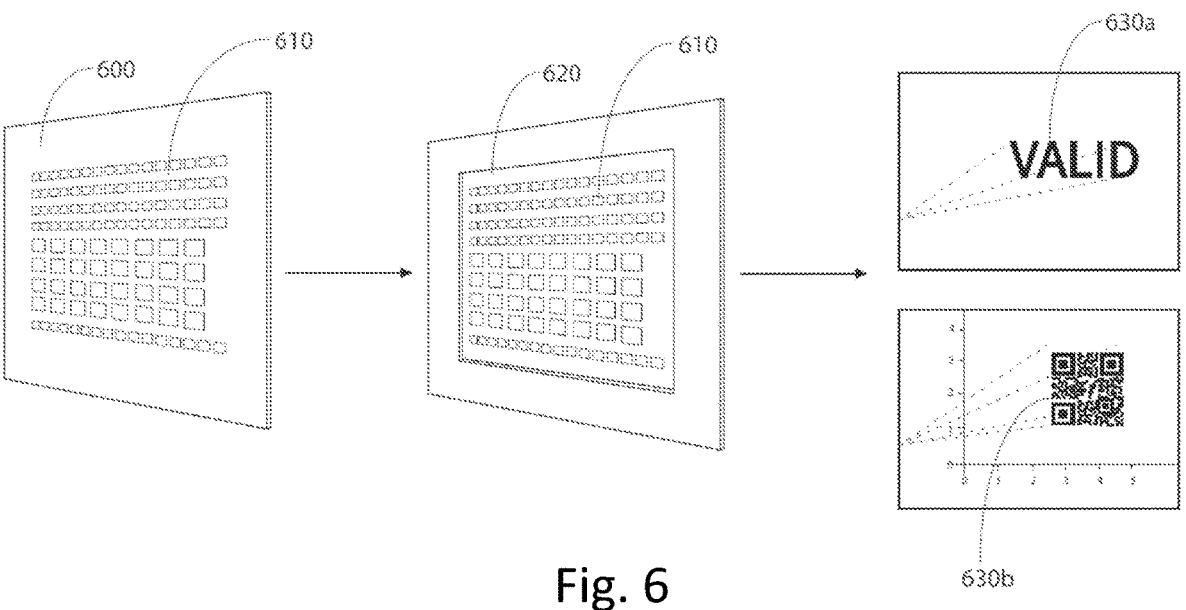
FIG. 6 shows a perspective view of a transmissive holographic interference pattern, label, substrate, or object according to the present invention.

Referring to FIG. 6, a series of holographic interference patterns 610 are shown etched into a master plate 600. Master plate 600 is applied to substrate 620 to stamp the holographic interference patterns 610 into the substrate. In the illustrated embodiment, substrate 620 comprises a transparent sheet of PET. The holographic interference patterns 610 can be constructed and arranged to display multiple and different images depending on the coherent light source applied. When the proper structured light is applied to the holographic interference patterns 610, the light passes through substrate 620 to project image 630a for authentication, verification, or to otherwise be analyzed. If an alternative coherent light source is applied to the holographic interference patterns 610, a second different project image 630b is shown for authentication, verification, or to otherwise be analyzed. In one embodiment, each holographic interference pattern can be applied to a substrate. The holographic interference patterns can be created with identifiers or the identifiers can be applied to the object or substrate subsequently.

Figure 7:
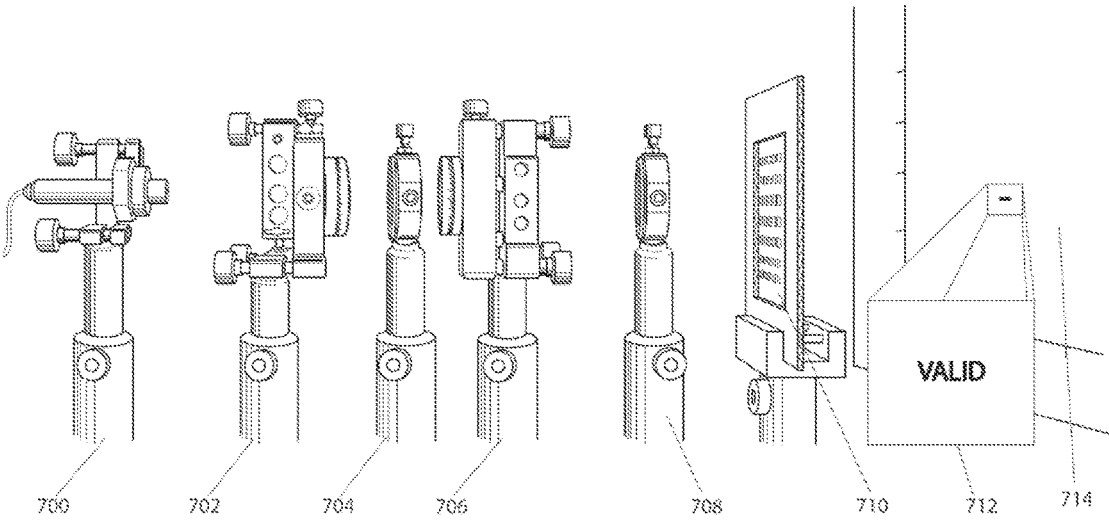
FIG. 7 shows a side view of a structure light lens arrangement projecting through a transmissive holographic interference pattern according to the present invention.

Referring to FIG. 7, an example embodiment of a transmissive holographic interference pattern analyzer for verification, authentication and other analysis of the holographic interference pattern. In the illustrated arrangement, the system can include a light source such as a laser 700 that can be converted into structured light, including spiral light, that can be focused or otherwise directed by a first plano-convex lens 702. The light is then directed from the first plano-convex lens 702 through a pinhole spatial filter 704. Next, the light is directed from pinhole spatial filter 704 through a second plano-convex lens 706. The light is then directed through a spatial phase plate 708. From spatial phase plate 708 the now structured light is applied to the holographic interference pattern film 710, for example a transparent sheet of PET into which the holographic interference pattern has been stamped, etched, or otherwise applied into the PET substrate, as shown in FIG. 6. After the light is passed through the holographic interference pattern film 710, a projected image 712 is displayed on an adjacent surface 714 for validation with a visual inspection or via a code reader or other data collection sensor. The projected image can be compared with a known control image and if the images match, the holographic interference pattern can be found to be authentic, verified, or otherwise analyzed. A computerized system can include the light generator, sensor, reader and computer readable instructions to compare the resulting image with the original, control or predetermined image.

Figures 8, 9:
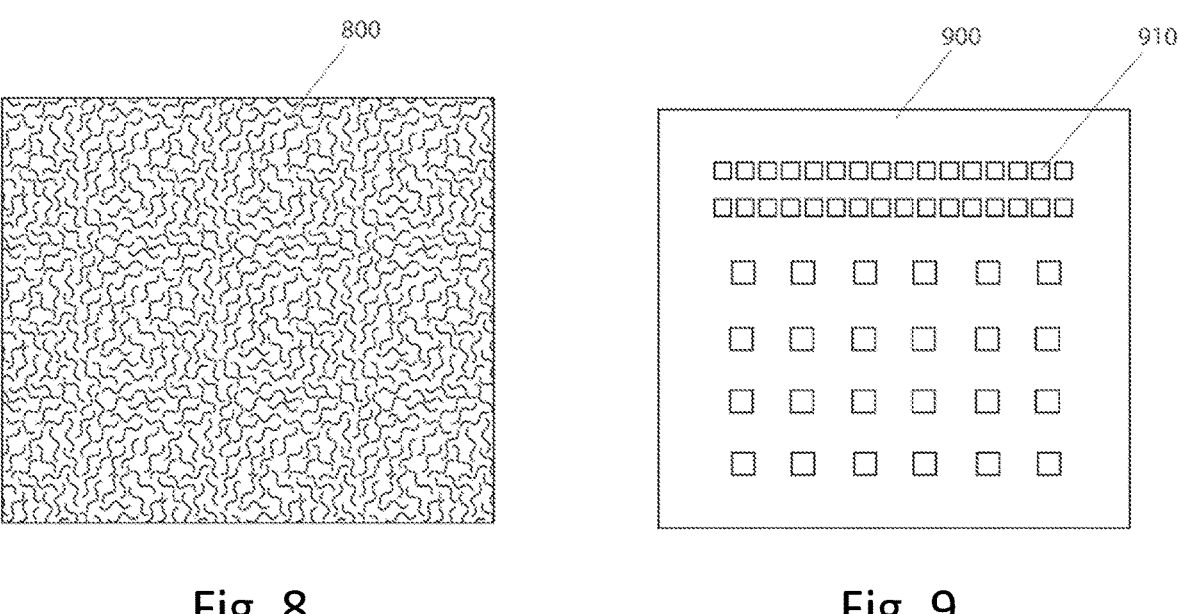
FIG. 8 shows a front view laser microscopy image of a reflective holographic interference pattern according to the present invention.
FIG. 9 shows a perspective view of a holographic interference label sheet according to the present invention.
Figure 10:
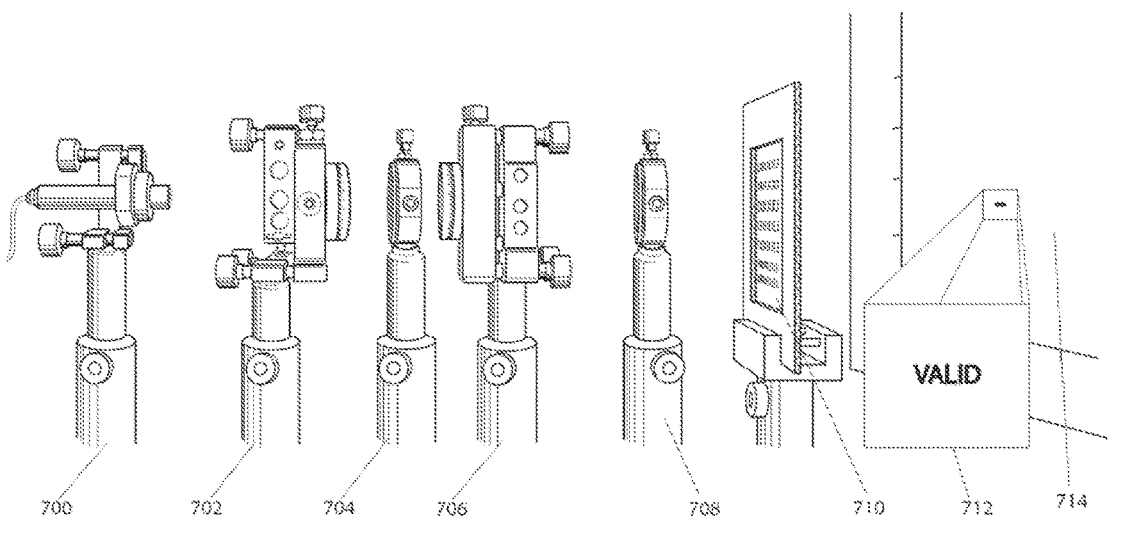
FIG. 10 shows a perspective view of a structure light lens arrangement projecting against and reflective off of a holographic interference pattern or transmit through a holographic interference pattern.

Referring to FIG. 9, a series of holographic interference patterns 910 are shown on a reflective substrate 900. In the example embodiment, substrate 900 is a sheet of PET coated with a layer of silver or other reflective material. With further reference to FIG. 8, a laser microscopy image of the reflective surface 800 of the substrate with a holographic interference pattern is shown. The holographic interference patterns 910 are defined in the reflective coating applied to the sheet of PET. The reflective substrate 900 can include an adhesive backing layer for applying the substrate to an object, such as a glass vial. The series of holographic interference patterns 910 can be separated and applied to multiple objects. In this example embodiment, reflective substrate 900 reflects light from a structured light source, as shown in FIG. 10, to produce a projected image. When the proper structured light is applied to the holographic interference patterns 910, the light reflected from the reflective surface of the substrate 900 produced the project image for authentication, verification, or to otherwise be analyzed.

Referring to FIG. 10, an example embodiment of a reflective substrate reader for verification, authentication and other analysis of the holographic interference pattern is shown. In the illustrated arrangement, the reader includes a light source such as a laser 1000 that can be converted into structured light, including spiral light, that can be focused or otherwise directed by a first plano-convex lens 1002. The light is then directed from the first plano-convex lens 1002 through a pinhole spatial filter 1004. Next, the light is directed from pinhole spatial filter 1004 through a second plano-convex lens 1006. The light is then directed through a spatial phase plate 1008. From spatial phase plate 1008 the now structured light is applied to the holographic interference pattern film 1010, for example a reflective sheet of PET into which the holographic interference pattern has been stamped, etched or otherwise transcribed into the reflective coating applied to the PET substrate, as shown in FIG. 9. After the light is reflected from the holographic interference pattern film 1010, a projected image 1012 is displayed on an adjacent surface 1014 for validation with a visual inspection or via a code reader or other data collection sensor. The projected image can be compared with a known control image and if the images match, the holographic interference pattern can be found to be authentic, verified, or otherwise analyzed.

Figure 11:
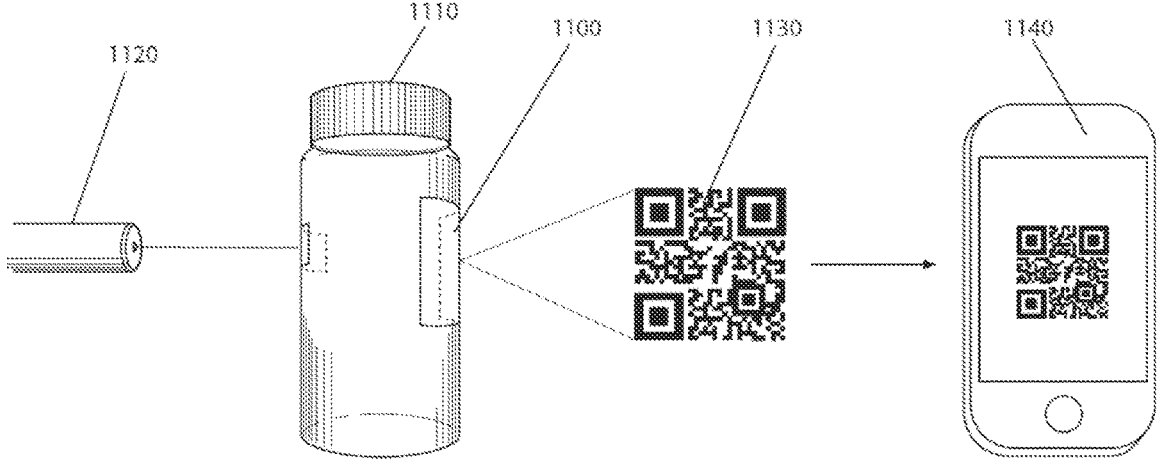
FIG. 11 shows a schematic of a tagging and authentication system according to the present invention.

Referring to FIG. 11, a computer-generated holography authentication process is provided in which a pattern 1100 is applied to a glass vial 1110, which is probed with a specific frequency of light 1120, after which a specific projected image 1130 is produced by the pattern that can then be read by a charged coupled device or other data collection sensor 1140, for example, a smart phone with a sensor and an authentication application. The smart phone can be adapted to become a holographic interference pattern reader and analyzer. The holographic interference pattern can be a computer-generated holography that can be adapted for providing a covert technology that can reduce and seeks to eliminate counterfeit attempts. The computer-generated holography can be embedded directly into a given product (such as glass vial 1110) or applied to a label or other material that can be affixed to the product. The computer-generated holography pattern may be invisible to the naked eye or may appear as an aberration on the surface of a given product. However, unless the suitable coherent light source is applied to the pattern, no proper projected resulting image will appear. Once the suitable light source is applied to the holographic interference pattern 1100, the projected image 1130 can be validated.

The holographic interference pattern can be affixed or attached to the object, such as a container or vial, when the object or container is being manufactured and when filed. The process of adding the holographic interference pattern can be performed in a sterile environment process before or after the container is filled and/or sealed. In the event that an irregularity was detected serialized labeling can provide for when the irregularity as it can be identified between the unique or serialized information.

Figure 12A:
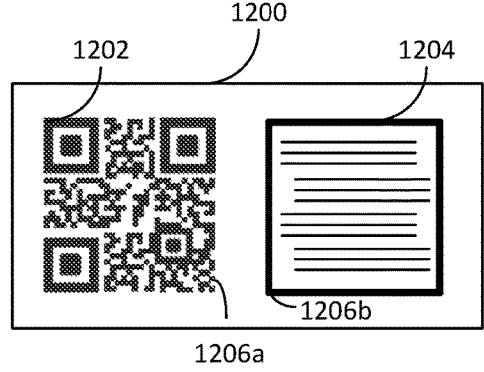
FIGS. 12A and 12B are front views of aspects of a substrate with a holographic interference pattern and identifier.
Figure 12B:
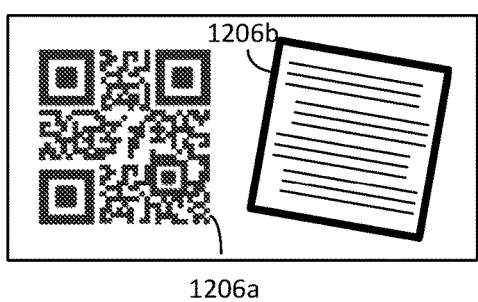

Referring to FIG. 12A, a substrate 1200 can be a label with an adhesive that can be affixed to an object such as a container or vial. The substrate can include an identifier 1202 and holographic interference pattern 1204. The identifier and the holographic interference pattern can be aligned on the substrate, for example with parallel inner edges 1206*a* and 1206*b*. The alignment between the identifier and the holographic interference pattern can be predetermined and can be known for a particular substrate. In the event that a scanner or visual observation shows that the actual alignment is not consistent with the predetermined alignment, an indication that the identifier and/or the holographic interference pattern may not be authentic. Referring to FIG. 12B, the identifier and/or the holographic interference pattern are shown out of alignment wherein the inner edges are not parallel indicating that the identifier, substrate, label, holographic interference pattern and any combination may not be authentic. This verification of alignment can be in conjunction with the verification of the holographic interference pattern. A computer system can have a predetermined, known or control alignment and compare these to the actual alignment as an indicator of the authenticity or vilification of the object.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

It is to be understood that the summary of the invention and the detailed description are of a preferred embodiment and not restrictive of the invention or other alternate embodiments of the invention. While the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from these summaries and certain embodiments described below, and will be readily apparent to those skilled in the art. Such objects, features, benefits, and advantages will be apparent from the above in conjunction with the accompanying examples, data, figures, and all reasonable inferences to be drawn therefrom, alone or with consideration of the references incorporated herein.

What is claimed is:

1. A system for uniquely tagging and verifying authenticity of an article comprising:

an object having a curvature;

a holographic interference pattern created according to a three-dimensional predetermined image and the curvature wherein the holographic interference pattern is applied to the object;

a three-dimensional resulting image projected on a planar surface in response to the holographic interference pattern being illuminated by a first coherent light source; and, a validation information created according to a comparison of the three-dimensional predetermined image and the three-dimensional resulting image;

wherein the holographic interference pattern is affixed to a substrate, the substrate is affixed to the object; and, wherein the curvature is created by affixing the substrate is adapted to be affixed to the object.

2. The system of claim 1 including a computerized validation system adapted to receive the three-dimensional predetermined image, receive the three-dimensional resulting image, and create the validation information according to the comparison of the three-dimensional predetermined image and the three-dimensional resulting image.

3. The system of claim 1 wherein the holographic interference pattern, when applied to the object, includes a first refractive index and a second reflective index, wherein the three-dimensional resulting image is formed according to the holographic interference pattern, the first refractive index, and the second refractive index.

4. The system of claim 1 wherein the holographic interference pattern is created according to a creation computerized system adapted to create the three-dimensional predetermined image according the three-dimensional predetermined image and the curvature of the object.

5. The system of claim 1 including an identifier applied to the object and having a predetermined alignment with the holographic interference pattern.

6. The system of claim 5 including a computerized validation system adapted to receive an image of the object having the identifier and the holographic interference pattern, determine a position of the identifier in relation to the holographic interference pattern and create an alignment verification information representation that the identifier and the holographic interference pattern applied to the object are consistent with the predetermined alignment.

7. The system of claim 5 wherein the identifier includes information taken from the group consisting of a logo, bar code, alpha numeric text, QR code, manufacturer information, manufacturing location, product description, manufacturing date, lot, expiry, ingredients, contents, and any combination thereof.

8. The system of claim 1 wherein an identifier is affixed to the substrate.

9. The system of claim 8 wherein the identifier is affixed to the substrate according to a predetermined alignment.

10. The system of claim 1 wherein the substrate is taken from the group consisting of a glass surface, curved surface, sticker, adhesive, plastic, metal, ceramic, and any combination thereof.

11. The system of claim 1 wherein the holographic interference pattern is created according to a reflective property of the substrate.

12. The system of claim 1 wherein the holographic interference pattern is created according to a reflective index associated with the substrate.

13. A system for uniquely tagging and verifying authenticity of an article comprising:

an object having a curvature;

a holographic interference pattern created according to a three-dimensional predetermined image and the curvature wherein the holographic interference pattern is applied to the object;

a three-dimensional resulting image projected on a planar surface in response to the holographic interference pattern being illuminated by a first coherent light source; and, a validation information created according to a comparison of the three-dimensional predetermined image and the three-dimensional resulting image; and, wherein the holographic interference pattern includes pillars that extend from the curvature in a parallel arrangement.

14. A system for uniquely tagging and verifying authenticity of an article comprising:

an object having a curvature;

a holographic interference pattern created according to a three-dimensional predetermined image and the curvature wherein the holographic interference pattern is applied to the object;

a three-dimensional resulting image projected on a planar surface in response to the holographic interference pattern being illuminated by a first coherent light source; and, a validation information created according to a comparison of the three-dimensional predetermined image and the three-dimensional resulting image; and, wherein the holographic interference pattern is etched onto the object.

15. The system of claim 1 wherein the holographic interference pattern is illuminated by a light having an orbital angular momentum.

16. A system for uniquely tagging and verifying authenticity of an article comprising:

an object having a curvature;

a holographic interference pattern created according to a three-dimensional predetermined image and the curvature wherein the holographic interference pattern is applied to the object;

a three-dimensional resulting image projected on a planar surface in response to the holographic interference pattern being illuminated by a first coherent light source; and, a validation information created according to a comparison of the three-dimensional predetermined image and the three-dimensional resulting image; and, wherein the holographic interference pattern is illuminated by a structured light having an orbital angular momentum according to a spiral phase plate.

17. A system for uniquely tagging and verifying authenticity of an article comprising:

an object having a curvature;

a computer system adapted to:

receive a three-dimensional predetermined image, create a holographic interference pattern created according to the three-dimensional predetermined image and the curvature wherein the holographic interference pattern is applied to the object, project a three-dimensional resulting image projected on a planar surface in response to the holographic interference pattern being illuminated wherein the computer system receives the three-dimensional resulting image, create validation information according to a comparison of the three-dimensional predetermined image and the three-dimensional resulting image; and, wherein the holographic interference pattern is affixed to a substrate, the substrate is affixed to the article; and the curvature is created by affixing the substrate to the article.

18. A system for uniquely tagging and verifying authenticity of an article comprising:

an object having a holographic interference pattern and identifier disposed on a substrate affixed to the object wherein the object includes a curvature;

a three-dimensional predetermined image;

a computerized system adapted to create the holographic interference pattern according to the three-dimensional predetermined image and the curvature, illuminate the holographic interference pattern with a coherent light source, produce a three-dimensional resulting image according to an illumination of the holographic interference pattern and create validation information according to a comparison of the three-dimensional predetermined image and the three-dimensional resulting image; and, wherein the holographic interference pattern is affixed to a substrate, the substrate is affixed to the object, and the curvature is created by affixing the substrate to the object.

* * * * *